United States Patent
Cronin (10) Patent No.: US 12,002,461 B2
(45) Date of Patent: Jun. 4, 2024

(54) VOICE BASED WAGERING

(71) Applicant: AdrenalineIP, Washington, DC (US)

(72) Inventor: John Cronin, Jericho, VT (US)

(73) Assignee: AdrenalineIP, Washington, DC (US)

( * ) Notice: Subject to any disclaimer, the term of this patent is extended or adjusted under 35 U.S.C. 154(b) by 200 days.

(21) Appl. No.: 17/313,130

(22) Filed: May 6, 2021

(65) Prior Publication Data

US 2022/0122601 A1 Apr. 21, 2022

Related U.S. Application Data (60) Provisional application No. 63/093,940, filed on Oct. 20, 2020.

(51) Int. Cl.
| | |
|---|---|
| *G10L 15/00* | (2013.01) |
| *G06V 40/16* | (2022.01) |
| *G07F 17/32* | (2006.01) |
| *G10L 15/18* | (2013.01) |
| *G10L 15/22* | (2006.01) |
| *G10L 15/26* | (2006.01) |

(52) U.S. Cl.
CPC .......... *G10L 15/22* (2013.01); *G06V 40/172* (2022.01); *G07F 17/323* (2013.01); *G07F 17/3288* (2013.01); *G10L 15/18* (2013.01); *G10L 15/26* (2013.01); *G10L 2015/223* (2013.01)

(58) Field of Classification Search
CPC ....... G10L 15/22; G10L 15/26; G07F 17/323; A63F 13/215
See application file for complete search history.

(56) References Cited

U.S. PATENT DOCUMENTS

| | | | | |
|---|---|---|---|---|
| 6,383,074 | B1* | 5/2002 | Boggs | G07F 17/32 |
| | | | | 463/6 |
| 8,784,197 | B2* | 7/2014 | Alderucci | G07F 17/323 |
| | | | | 463/29 |
| 9,111,413 | B2 | 8/2015 | Gagner et al. | |
| 2003/0109310 | A1* | 6/2003 | Heaton | A63F 3/00157 |
| | | | | 463/42 |
| 2004/0266527 | A1* | 12/2004 | Anderson | A63F 13/215 |
| | | | | 463/36 |
| 2006/0178209 | A1* | 8/2006 | Shultz | G07F 17/3209 |
| | | | | 463/28 |
| 2008/0268957 | A1 | 10/2008 | Nguyen et al. | |
| 2010/0120529 | A1* | 5/2010 | Shimabukuro | G06F 21/575 |
| | | | | 463/43 |
| 2011/0065490 | A1 | 3/2011 | Lutnick | |
| 2012/0173376 | A1 | 7/2012 | Soroca et al. | |
| 2013/0316774 | A1 | 11/2013 | Lutnick et al. | |

(Continued)

OTHER PUBLICATIONS

International Search Report and Written Opinion issued on Jan. 26, 2022 in corresponding International Patent Application No. PCT/US2021/055386; 11 pages.

*Primary Examiner* — Daniel Abebe
(74) *Attorney, Agent, or Firm* — Maier & Maier, PLLC (57) ABSTRACT

A device that provides for voice based wagering on live action events. The device has microphone capabilities that can actively or passively listen to voice input and interpret the input with respect to wagering opportunities or other requests. For example, users can speak into the microphone and navigate different "in-play" bets and select wagering options. In-play bets are the ability to place bets while an event or game is ongoing.

17 Claims, 5 Drawing Sheets

(56) References Cited

U.S. PATENT DOCUMENTS

| | | | |
|---|---|---|---|
| 2013/0337889 A1* | 12/2013 | Gagner | G07F 17/323 463/36 |
| 2014/0179413 A1* | 6/2014 | Thompson | G07F 17/3206 463/25 |
| 2014/0206428 A1* | 7/2014 | Thompson | G07F 17/3204 463/20 |
| 2014/0370958 A1 | 12/2014 | Lutnick | |
| 2019/0105564 A1 | 4/2019 | Marks et al. | |
| 2021/0012609 A1* | 1/2021 | Froy, Jr. | G07F 17/3209 |

* cited by examiner

VOICE BASED WAGERING

FIELD

The embodiments are generally related to play-by-play wagering on live sporting events.

BACKGROUND

Current sports betting platforms provide numerous different ways to wager on entire sporting events or individual aspects or portions of those events. One problem that arises with placing bets during a live event is that the placing of the bet and the subject of the bet (i.e., the next play of the game) are very close to each other in time. This means the window for placing a bet may only be open for a matter of minutes or seconds.

As the betting window must close before the portion of the event is complete, users need to be made aware of how little time they have left so that they are not cut off from making a wager. If, for example, a user is in the middle of placing a bet and the next play of the game begins, the user will lose the ability to finish making that bet. This may lead to users becoming frustrated.

SUMMARY

The embodiments include methods, systems, and apparatuses for wagering, such as voice based wagering. One embodiment includes a database storing wagers made in a play-by-play wagering game on actions in a live sporting event during the live sporting event; a natural language processor configured to receive user speech and store the user speech in a speech database; and an artificial intelligence module that analyzes the user speech in the speech database and delivers context-appropriate responses that provide context-appropriate information or wagers for wagers on plays inside of the live sporting event.

BRIEF DESCRIPTIONS OF THE DRAWINGS

The accompanying drawings illustrate various embodiments of systems, methods, and various other aspects of the embodiments. Any person with ordinary art skills will appreciate that the illustrated element boundaries (e.g., boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION OF THE EMBODIMENTS

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "bet" or "wager". A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, or perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are services that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, by creating and delivering actionable insights on performance to help customers to manage the sports gaming. Business Applications can be integrated into the embodiments in a variety of manners.

State based integration allows for a given sports gambling game to be modified by states in the United States or other countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

Figure 1:
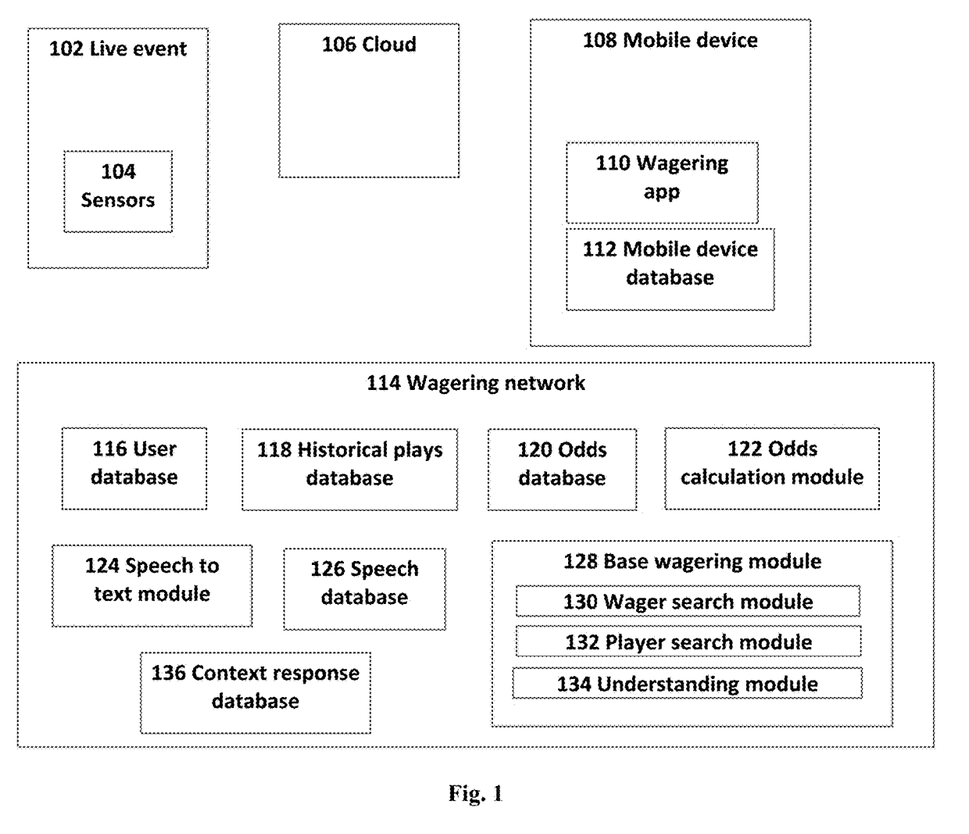
FIG. 1: Illustrates a voice-based wagering system, according to an embodiment.

FIG. 1 is a system for voice-based wagering. This system may include a live event 102, for example, a sporting event such as a football game, basketball game, baseball game, hockey game, tennis match, golf tournament, eSports or digital game, etc. The live event 102 will include some number of actions or plays, upon with a user or bettor or customer can place a bet or wager, typically through an entity called a sportsbook. There are numerous types of wagers the bettor can make, including a straight bet, a money line bet, a bet with a point spread or line that the bettor's team would need to cover if the result of the game with the same as the point spread the user would not cover the spread, but instead the tie is called a push. If the user is betting on the favorite, they are giving points to the opposing side, which is the underdog or longshot. Betting on all favorites is referred to as chalk. This is typically applied to round-robin or other tournaments' styles. There are other types of wagers, including parlays, teasers, and prop bets, that are added games that often allow the user to customize their betting by changing the odds and payouts they receive on a wager. Certain sportsbooks will allow the bettor to buy points, to move the point spread off of the opening line. This will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have several bets they can handle, a limit of wagers they can take on either side of a bet before they will move the line or odds off of the opening line.

Additionally, there are circumstances, such as an injury to an important player such as a listed pitcher, in which a sportsbook, casino, or racino will take an available wager off the board. As the line moves, there becomes an opportunity for a bettor to bet on both sides at different points, spreads to middle, and win both bets. Sportsbooks will often offer bets on portions of games, such as first-half bets and half-time bets. Additionally, the sportsbook can offer futures bets on live events 102 in the future. Sportsbooks need to offer payment processing services in order to cash out customers. This can be done at kiosks at the live event or at another location.

Further, embodiments may include a plurality of sensors 104 that may be used such as motion sensors, temperature sensors, humidity sensors, optical sensors and cameras such as an RGB-D camera which is a digital camera capable of capturing color (RGB) and depth information for every pixel in an image, microphones, radiofrequency receiver, a thermal imager, a radar device, a lidar device, an ultrasound device, a speaker, wearable devices, etc. Also, the plurality of sensors may include tracking devices, such as RFID tags, GPS chips, or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or a communication network that may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques are known in the art. The communication network may allow ubiquitous access to shared pools of configurable system resources and higher-level services that can be rapidly provisioned with minimal management effort, often over the internet, and relies on sharing of resources to achieve coherence and economies of scale, like a public utility. In contrast, third-party clouds allow organizations to focus on their core businesses instead of expending resources on computer infrastructure and maintenance.

Cloud 106 may be communicatively coupled to peer-to-peer wagering network 114, which may perform real-time analysis on the type of play and the result of the play. The cloud 106 may also be synchronized with game situational data, such as the time of the game, the score, location on the field, weather conditions, and the like, which may affect the choice of play utilized. For example, in other exemplary embodiments, the cloud may not receive data gathered from sensors 104 and may, instead, receive data from an alternative data feed, such as Sports Radar®. This data may be compiled substantially immediately following the completion of any play, and the data from this feed may be compared with a variety of team data and league data based on a variety of elements, including down, possession, score, time, team, and so forth, as described in various exemplary embodiments herein.

Further, embodiments may include a mobile device 108 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple iPhone. Some devices allow gesture recognition inputs by combining some of the inputs and outputs. Some devices allow for facial recognition, which may be utilized as an input for different purposes, including authentication and other commands. Some devices provide for voice recognition and inputs, including, e.g., Microsoft KINECT, SIRI for iPhone by Apple, Google Now, or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices, or group of devices may be augmented reality devices. An I/O controller may control the I/O devices. The I/O controller may control one or more I/O devices, such as e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments, an I/O device may be a bridge between the system bus and an external communication bus, e.g., a USB bus, a SCSI bus, a FireWire bus, an Ethernet bus, a Gigabit Ethernet bus, a Fiber Channel bus, or a Thunderbolt bus. In some embodiments, the mobile device 108 could be an optional component and would be utilized in a situation where a paired wearable device utilizes the mobile device 108 as additional memory or computing power or connection to the internet.

Further, embodiments may include a wagering software application or wagering app 110, which is a program that enables the user to place bets on individual plays in the live event 102 and display the audio and video from the live event 102, along with the available wagers on the mobile device 108. The wagering app 110 allows the user to interact with the wagering network 108 to place bets and provide payment/receive funds based on wager outcomes.

Further, embodiments may include a mobile device database 112 that may store some or all of the user's data, the live event 102, or the user's interaction with the wagering network 114.

Further, embodiments may include a wagering network 114, which may perform real-time analysis on the type of play and the result of a play or action. The wagering network 114 (or cloud 106) may also be synchronized with game situational data, such as the time of the game, the score, location on the field, weather conditions, and the like, which may affect the choice of play utilized. For example, in other exemplary embodiments, a wagering network 114 may not receive data gathered from sensors and may, instead, receive data from an alternative data feed, such as SportsRadar®. This data may be provided substantially immediately following the completion of any play, and the data from this feed may be compared with a variety of team data and league data based on a variety of elements, including down, possession, score, time, team, and so forth, as described in various exemplary embodiments herein. The wagering network 114 can offer several software as a service managed services such as user interface service, risk management service, compliance, pricing and trading service, IT support of the technology platform, business applications, game configuration, state-based integration, fantasy sports connection, integration to allow the joining of social media, as well as marketing support services that can deliver engaging promotions to the user.

Further, embodiments may include a user database 116, which may contain data relevant to all users of the wagering network 114, which may include, a user ID, a device identifier, a paired device identifier, wagering history, and wallet information for the user. The user database 116 may also contain a list of user account records associated with a respective user ID. For example, a user account record may include information such as user interests, user personal details such as age, mobile number, etc., sporting events played before, highest wager, favorite sporting event, and current user standings and balance corresponding to the user ID. In addition, the user database 116 may contain betting lines and search queries. The user database 116 may be searched based on a search criterion received from the user. Each betting line may include a plurality of betting attributes such as at least one of the live event 102, a team, a player, an amount of wager, etc. The user database 116 may include information related to all the users involved in the live event 102. In one example embodiment, the user database 116 may include information for generating a user authenticity report and a wagering verification report. Further, the user database 116 may be used to store user statistics like, but not limited to, the retention period for a particular user, frequency of wagers placed by a particular user, the average amount of wager placed by each user.

Further, embodiments may include a historical play database 118 that may contain play data for the type of sport being played in a live event 102. For example, in American Football, for optimal odds calculation, the historical play data should include metadata about the historical plays, such as time, location, weather, previous plays, opponent, physiological data, etc.

Further, embodiments may utilize an odds database 120 that contains the odds calculated by the odds calculation module 122 to display the odds on the user's mobile device 108 and to take bets from the user through the mobile device wagering app 110.

Further, embodiments may include an odds calculation module 122, which utilizes historical play data to calculate odds for in-play wagers.

Further, embodiments may include a speech to text module 124, which takes the speech captured by the user's mobile device 108, as well as the context of the wagering app 110 and converts the speech to text and stores the text data as well as the context data on the speech database 126.

Further, embodiments may include a speech database 126, which stores the data for the text from speech, timestamps of this text, the status of the wagering app 110, and the context of the live event 102 at the time the speech is received, etc.

Further, embodiments may include a base wagering module 128, which may allow the user to place wagers on the live event 102. The base wagering module 128 may have several functions, including base choice functionality, in which any button icon on the app "Bet on Pass," "Bet on Run" can be voiced in, and when that voice is translated, the button voiced in will flash to let the user know the player was "heard" and the user can voice in "OK" to approve. Numerical capability, in which the system could ask a question to the user such as "how much would you like to bet?" and then start blinking, waiting for voice response. The player may say "eleven dollars," the wagering app 110 hears the voice, and speech to text module 124 translates the voice to "11 dollars" on the screen region for the bet blinking, waiting for the player to say "OK" or otherwise confirming the entry or placement of a wager. The base wagering module 128 may prompt the wager search module 130 to allow the user to find the desired wager. The base wagering module 128 may prompt the user search module 132 (also called a player search module 132) to allow the user to search for statistics related to the live event 102, the players, or their wagering history. The base wagering module 128 may prompt the understanding module 134 to listen to the user for context related to their current wager to provide a personalized and context-appropriate response. The base wagering module 128 may retrieve available wagers for the selected element. In one embodiment, the base wagering module 128 may retrieve available wagers from the odds database 120. In this example, the base wagering module 128 retrieves available wagers for Aaron Judge (as a hitter), i.e., odds on Aaron Judge hitting a single are odds 4/1, and the odds of him hitting a home run are 5/1. Further, the base wagering module 128 may display a menu of available wagers related to the selected. In one embodiment, the menu may be displayed via the wagering app 110 on the display of the mobile device 108. Further, the base wagering module 128 may receive a wager from the user. For example, the user places a wager of $100 on Aaron Judge, hitting a single at odds 4/1. Further, base wagering module 128 may constantly monitor the live event 102 for completion of a given play. In one case, when the wagered upon play is concluded, then base wagering module 128 may proceed to obtain the results of the live event 102. For example, the result of the live event 102 is that Aaron Judge hits a single during the live event 102. In another case, when the live event 102 is not concluded, then the base wagering module 128 may continue monitoring the live event 102 for completion. Further, the base wagering module 128 may compare the result of the live event 102 with the user's wagers to determine a result, i.e., whether the user has won or lost. In this example, the wager of $100 placed for Aaron Judge hitting a single and the result of the live event 102, i.e., Aaron Judge hits a single, are compared to determine the result of the wager, i.e., a win for the user. Based on the comparison of the result of the live event and the wagers placed by the user, the base wagering module 128 may calculate the balance amount for the user. For example, the user wins the wager of $100 at +400 odds that Aaron Judge will hit a single on the next play and the result of the live event is Aaron Judge hits a single. Thus, the updated balance of the user (with an opening balance of $2000), after the completion of the live event, will be $2000+$400=$2400. Further, the base wagering module 128 may update the account balance of the user who places the wager. In this example, after winning the wager of $100 placed (at odds of 4/1), the updated balance of the user, i.e., $2400.

Further, embodiments may include a wager search module 130, which may allow the user to find the desired wager. The wager search module 130 could ask a question or type a question on the user mobile device 108 "what type of current player to bet on," the system listening for the user to say "pitcher" or "batter" or "centerfielder," or "jersey number 12". Once the voice is heard and translated, the selection blinks, for example, "batter," and then the app listens for an "OK," once heard, the "in play" bet for the "batter" is shown.

Further, embodiments may include a player or user search module 132, which may allow the user to ask generic search question" for historical information, such as the player invokes a "tell me" command. Then a search is done of the historical plays database 118 for the player the bet is about, such as "tell me the batters RBI's in the last year" and those statistics may be retrieved from the historical plays database 118. The player or user search module 132 may use the player's voice commands to show account information or to set alerts or settings. For instance, a player invokes a "show me" command, such as "show me how much I won" or "show me how much I have bet" or "show me my history of success on the current play" and the voice question is analyzed based upon the wagering app 110 data and wagering app 110 context (the current play).

Further, embodiments may include an understanding module 134, which may record the player's voice either before, during, or after the play. The understanding module 134 may relate the text from speech based upon this time, and the text is interpreted by AI to determine if there is an AI-based response for reaction, so for instance, the in-play was for a large bet on a run coming home, the payer bet on a run coming in when the bet was placed, the voice was activated to annotate a response, such as "I really want this run now, we need this run to get to the pennant," after the play and after the run is in, the AI has stocked positive answers since the play was one, and since the voice had pennant, the AI comes back and says, "congratulations bob, looks like you will get to the pennant race" or if the bet was a loss, no run, the AI comes back with stock, "so sorry Bob, maybe there will be another chance to get to the pennant" (if that is possible thru calculations).

Further, embodiments may include a context response database 136, which may contain key words and phrases that the understanding module 134 may identify, and potential responses to deliver based on the context of the play/wager and the key words or phrases.

Figure 2:
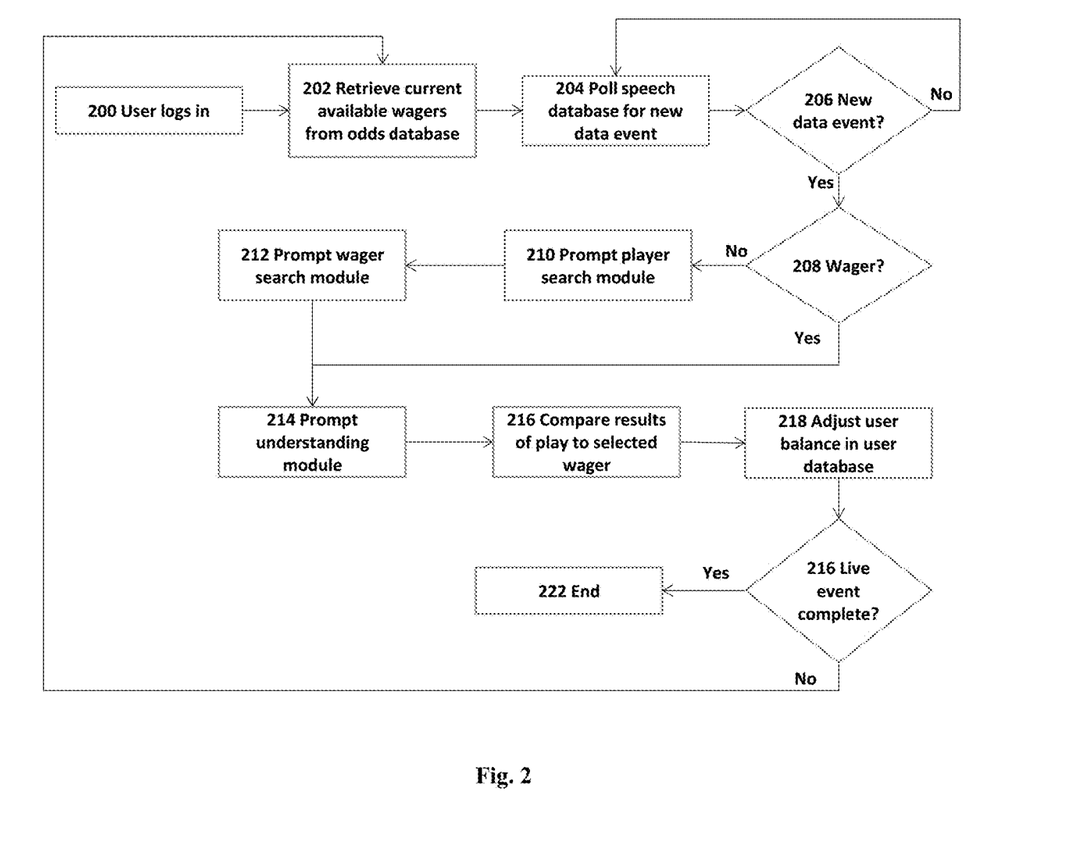
FIG. 2: Illustrates a base wagering module, according to an embodiment.

FIG. 2 illustrates the base wagering module 128. The process begins with the user logging in at step 200 to the wagering app 110. Available wagers on the live event 102 may then be retrieved at step 202 from the odds database 120. The speech database 126 may be polled at step 204 for a new data event. A new data event may be any speech converted to text by the speech to text module 124. The speech to text module 124 may be active whenever the user is connected to the wagering app 110. The speech to text module 124 may be trained to recognize the user's voice to allow the speech to text module 124 to filter out speech from other users. This recognition may allow users to interact with the system while in a noisy environment without the background speech interfering. In one embodiment, the speech to text module 124 may only process speech when the user may be identified by a sensor on the mobile device 108 to avoid processing background speech. For example, the speech to text module 124 may only process speech when a facial recognition system on the mobile device 108 detects the user, or a wearable device such as augmented reality glasses may have a microphone that is located near enough to the user to separate speech that comes from the user from background speech. The speech database 126 may continue to be polled until a new data event is identified at step 206. It may then be determined at step 208 if the new data event is related to a wager. For example, the user may say "Bet on Pass" or "Bet on Run" In one embodiment, the mobile device 108 display may flash to indicate to the user that they were heard, and the user may voice "OK" to approve the wager. If the new data event is a "tell me" or "show me" command, the user or player search module 132 may be prompted at step 210. For example, the user may say, "how has Aaron Judge done against Clayton Kershaw in the past." The user or player search module 132 may retrieve that data from the historical plays database 118. If the new data event is related to a wager, the wager search module 130 may be prompted at step 212. For example, the user may say, "show me all wagers on the batter." The wager search module 130 may query the odds database 120 for wagers available on the current batter in the live event 102. In one embodiment, the wager search module 130 may begin without a prompt. For example, if no new data event is identified in the speech database 126, the wager search module 130 may be prompted to ask, "what type of current player do you wish to bet on?" or "do you want to bet on a run?" Once the user has selected a wager, the understanding module 134 may be prompted at step 214. The understanding module 134 may monitor the speech database 126 during the wagered upon play to deliver a personalized and context-appropriate response to the user. This may be to increase their enjoyment or engagement with the wagering app 110. The results of the current play in the live event 102 may be compared, at step 216, to the wagered upon outcome. The user's account balance in the user database 116 may be adjusted at step 218 based on the results of the wagered upon play. In one embodiment, the settlement of wagers and/or managing of accounts may be handled by a third-party financial services provider. It may then be determined, at step 220, if the live event 102 is complete? If the live event 102 is not complete, the process returns to step 202. If the live event 102 has concluded, or the user has logged off of the wagering app 110, the process ends at step 222.

Figure 3:
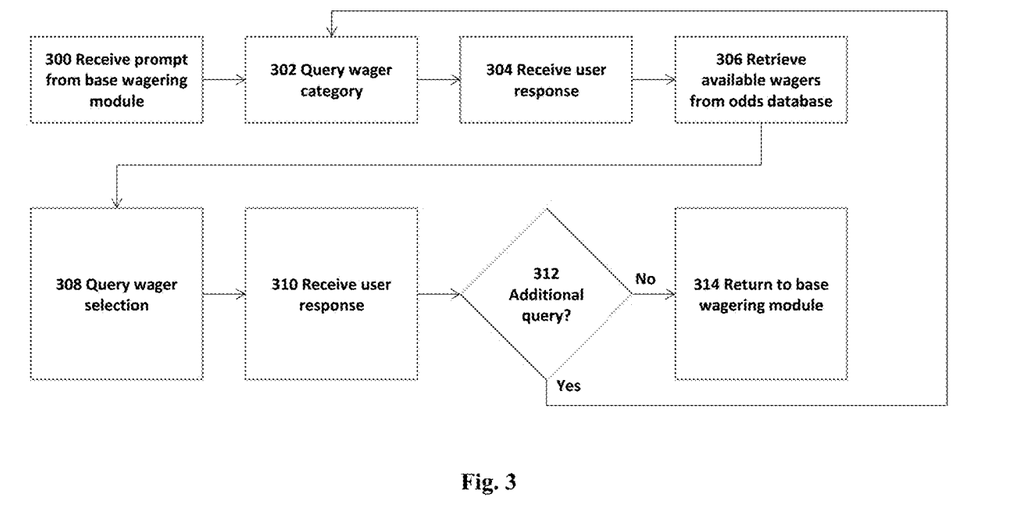
FIG. 3: Illustrates a wager search module, according to an embodiment.

FIG. 3 illustrates the wager search module 130. The process begins with receiving a prompt from the base wagering module 128. The wager category the user may be interested in may then be queried at step 302. For example, the user may be asked, "what type of player do you want to bet on?" or "do you want to bet on a pass?" The user's response may be received at step 304. For example, the user may say "pitcher" or "batter" or "centerfielder" or "jersey number 12" The wagers available for the selected wager category may be retrieved at step 306 from the odds database 120. For example, if the user says "batter," the current player at-bat in the live event 102 may be identified, and the wagers related to them, such as a 3/1 on a hit and 4/1 on a strikeout. The wager selection the user may be interested in may then be queried at step 308. For example, the system may say, or display on the user's mobile device 108, "how much would you like to wager?" or "do you want to bet on run or pass?" or "will Aaron Judge strikeout?" The user's response may be received at step 310. It may then be determined at step 312 if there is an additional query. For example, if the user were asked at step 308, "how much would you like to bet?" and then start blinking, waiting for a voice response. The player may say "eleven dollars," the speech-to-text module 124 may hear the voice and translates the voice to "11 dollars" on the screen region for the bet blinking, waiting for the player to say "OK." The user may also indicate they wish to look at other available wagers, such as a wager on the pitcher, and the process may return to step 302 if there are no additional queries the process returns, at step 314 to the base wagering module 128.

Figure 4:
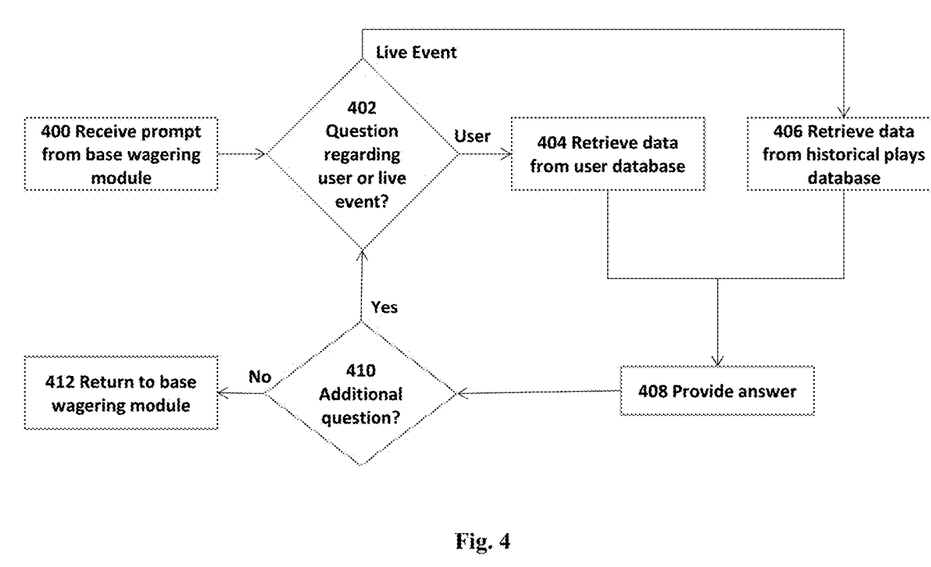
FIG. 4: Illustrates a player search module, according to an embodiment.

FIG. 4 illustrates the user or search module 132. The process begins with receiving, at step 400, a prompt from the base wagering module 128 indicating the user asked a question that may be related to the user or the live event 102. It should be obvious to one skilled in the art that the functions of the user or player search module 132, the wager search module 130 may have some or all of their functions combined. It may be determined at step 402 if the question is related to the user or the live event 102. For example, the user may ask a generic search question for historical information, such as when the user invokes a "tell me" command, such as "tell me the batters RBI's in the last year." The user may ask to be shown account information or to set alerts or settings. For example, a user invokes a "show me" command, such as "show me how much I won" or "show me how much I have bet" or "show me my history of success on the current play." If the question is about the user, the user database 116 may be queried at step 404. For example, if the user asked, "show me how much I have bet," the user's wager history may be retrieved. If the question is about the live event 102, the historical plays database 118 may be queried at step 406. For example, if the user asked, "tell me the batter's RBI's in the last year," the current batter's statistics for the previous season may be retrieved. The answer to the user's question may be provided at step 408. In one embodiment, the response may be delivered by voice. It may also be displayed on the mobile device 108. In one embodiment, the mobile device 108 may be a remote control for a smart television. In that example, the response may be displayed on the television. It may then be determined at step 410 if the user has additional questions. If the user has additional questions, the process returns to step 402. If the user does not have any more questions, the process returns at step 412 to the base wagering module 128.

Figure 5:
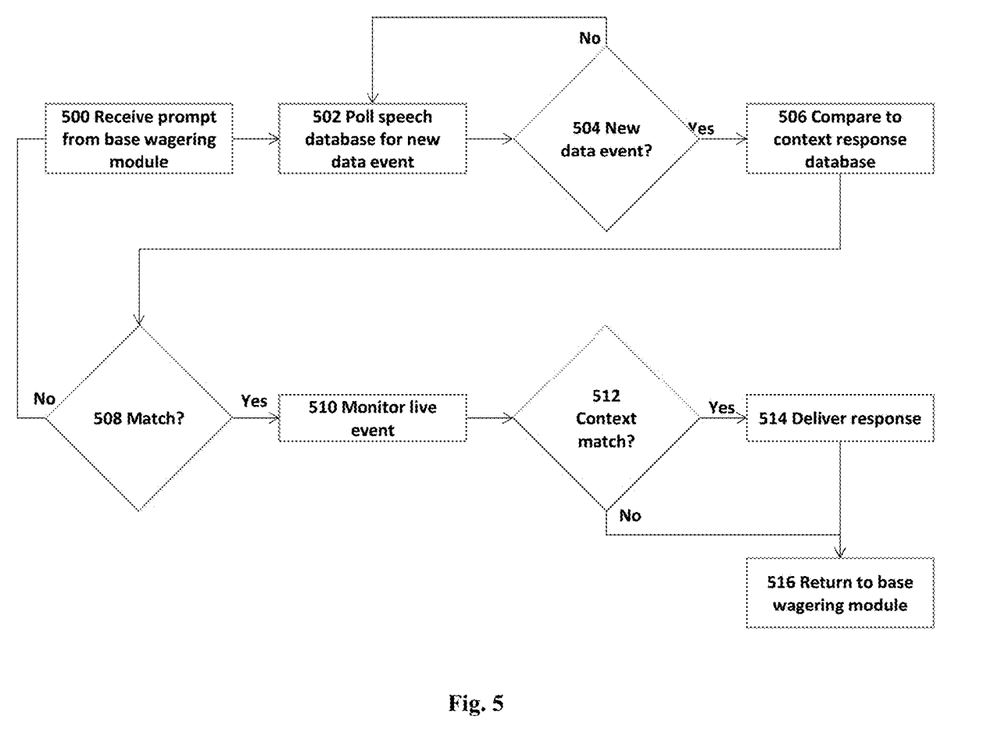
FIG. 5: Illustrates an understanding module, according to an embodiment.

FIG. 5 illustrates the understanding of module 134. The process begins with receiving at step 500, a prompt from the base wagering module 128 indicating that the user has placed a wager on at least one outcome of the current play in the live event 102. The understanding module 134 may then poll at step 502, the speech database 126, for a new data event. A new data event may be user speech that may be converted to text by the speech to text module 124. It may be determined at step 504 if there is a new data event in the speech database 126. If there is no new data event detected, the process returns to step 502. The understanding module 134 may continue to poll the speech database for a new data event until the current play that has been wagered upon has concluded. If a new data event is detected, the understanding module 134 may compare, at step 506, the text of the new data event to the context response database 136. For example, the user placed a large wager on a run coming home, and the speech-to-text module 124 identified the user saying, "I really want this run now. We need this run to get to the pennant." The context response database 136 may indicate the word pennant is relevant. The context response database 136 may indicate, at step 508, a match to the words run and pennant. If no match is identified at step 508, the process may return to step 502 and poll for new speech to text data events until the play is concluded. If there is a match identified at step 508, the live event 102 may be monitored at step 510. It may be determined, at step 512, if there is a context characteristic of the live event 102 that matches a possible response in the context response database 136. For example, the word pennant may prompt a query of the historical plays database 118 for the current league standings and identify that the team the user wagered upon, in this case, the New York Yankees, are in first place in the league and could clinch the American League pennant with a win in the current live event 102. The wagered upon run would put the New York Yankees ahead in the game. The context response database 136 may have a number of potential responses based on the live event's different context characteristics, the wager, and the user. For example, if the run scores on the current play, the context response database 136 may indicate a response of "Congratulations (insert user name), your (wagered upon team name) are one step closer to winning the pennant." The indicated response if the run does not score, and there is an opportunity to still score the run, may be "Don't worry (insert user name), (insert next batter's name) can still get this run home." There may not be an indicated response in the context response database 136 if the run does not score and there is not an immediate opportunity to score the run. Responses may be designed to be positive to keep the user in a good mood so that they remain engaged in wagering upon the live event 102. In one embodiment, the responses may be based on the context of the wager. For example, a user may be heard to say, "If I win this, we can get that new car." Artificial intelligence may identify the name of a consumer product, such as a car, or TV, or pair of shoes, within two words of the word "new" and determine that the user may be talking about what they may do with the money if they win the current wager. If the user wins their wager, the context response database 136 may indicate a response of "Congratulations (insert user name), now you can get that car!" In one embodiment, user spending history may be compared to speech captured during certain wagering contexts through linear regression to identify words, phrases, or other text combinations that have a correlation coefficient above a pre-defined threshold with certain spending behavior. In one embodiment, trends in user wagering history may be convolved with the volume to speech captured during certain wagering contexts to identify excitement levels that may be highly correlated with certain wagering activity. For example, a user has a steadily rising volume level through the play and a sustained high volume level for 5 seconds after the play concluded. When it coincides with a wager the user won, this pattern may be highly correlated with the user making a follow-up bet. The system may then say, "Great win (user), want to go double or nothing on (insert wager option)." If a match is identified at step 512, the response indicated in the context response database 136 may be delivered to the user. This may be audibly or via text on the display of the user's mobile device 108 or other secondary display. The process then returns, at step 516, to the base wagering module 128.

What is claimed is:

1. A system for voice-controlled wagering on a wagering system, comprising:
  a database storing currently available wagers in a wagering game, the currently available wagers related to actions either performed by a participant of live sporting event or occurring in the live sporting event;
  a natural language processor configured to receive user speech and store the user speech as text in a speech database;
  an artificial intelligence module that analyzes the user speech in the speech database and delivers context-appropriate responses that provide context-appropriate information based on current data stored in the database storing currently available wagers and gathered from the live sporting event or for wagers on plays inside of the live sporting event, and
  one or more sensors located at the live sporting event, wherein the sensors collect and stream information to the database storing currently available wagers in real time during the live sporting event, and updating the content of the database storing currently available wagers.

2. The system for voice-controlled wagering on the wagering system of claim 1, wherein the natural language process provides an indicia that user speech is received.

3. The system for voice-controlled wagering on the wagering system of claim 1, wherein the natural language processor further translates user speech and automatically inputs a wager associated with the user speech.

4. The system for voice-controlled wagering on the wagering system of claim 3, wherein the natural language processor enters a wager associated with the user speech following receipt of further user speech confirming the wager.

5. The system for voice-controlled wagering on the wagering system of claim 1, further comprising at least one of a wager search module that searches current available wagers in the database storing currently available wagers based on the user speech, a player search module that searches currently available wagers in the database storing currently available wagers on a player associated with the user speech, and a user search module that searches information associated with the user from collected user metadata.

6. The system for voice-controlled wagering on the wagering system of claim 1, further comprising an understanding module, wherein the understanding module interfaces with the artificial intelligence module that contextually compares user speech received by the natural language processor and outputs speech contextually related to the user speech and at least one of placing of a wager on a live sporting event or an outcome of that wager as determined by data gathered from the live sporting event.

7. The system for voice-controlled wagering on the wagering system of claim 1, further comprising a speech to text module that is automatically activated when a user initiates a wagering game.

8. The system for voice-controlled wagering on the wagering system of claim 1, further comprising a wager search module that automatically searches available wagers in an odds database continually updated based on data gathered from live sporting events and other sources and provides the user with one or more wagers.

9. The system for voice-controlled wagering on the wagering system of claim 8, further comprising an understanding module that is automatically activated upon the receipt of a wager by the user following a prompt from the wager search module, and the understanding module provides a context-appropriate response to the user following at least one of a result of a placed wager or an outcome of an event in the live action game.

10. The system for voice-controlled wagering on the wagering system of claim 9, wherein the wager search module may provide the user with prompts to provide or request information regarding the live action game automatically based on the status of the life sporting event.

11. The system for voice-controlled wagering on the wagering system of claim 1, wherein the context-appropriate responses are delivered by audio and/or display.

12. The system for voice-controlled wagering on the wagering system of claim 1, further comprising an understanding module that is automatically activated and provides a context-appropriate wager query to the user based on context of the user speech received by the natural language processor.

13. The system for voice-controlled wagering on the wagering system of claim 8, wherein the understanding module outputs a query associating a wager that recites one or more context characteristics of the user speech received by the natural language processor.

14. The system for voice-controlled wagering on the wagering system of claim 1, further comprising a speech to text module that recognizes the speech of the user and automatically filters out background speech.

15. The system for voice-controlled wagering on the wagering system of claim 14, further comprising one or more sensors that associate the speech with the user.

16. The system for voice-controlled wagering on the wagering system of claim 15, further comprising a facial recognition system.

17. The system for voice controlled wagering on the wagering system of claim 1, wherein the one or more sensor comprise a camera.

* * * * *